March 6, 1934.  J. D. NIES  1,949,727
ELECTRIC BRAKE FOR SLIP RING MOTORS
Filed April 6, 1931  2 Sheets-Sheet 1

Inventor:
John D. Nies,
By Wilkinson, Huxley, Byron & Knight
Attys.

March 6, 1934.    J. D. NIES    1,949,727
ELECTRIC BRAKE FOR SLIP RING MOTORS
Filed April 6, 1931    2 Sheets-Sheet 2
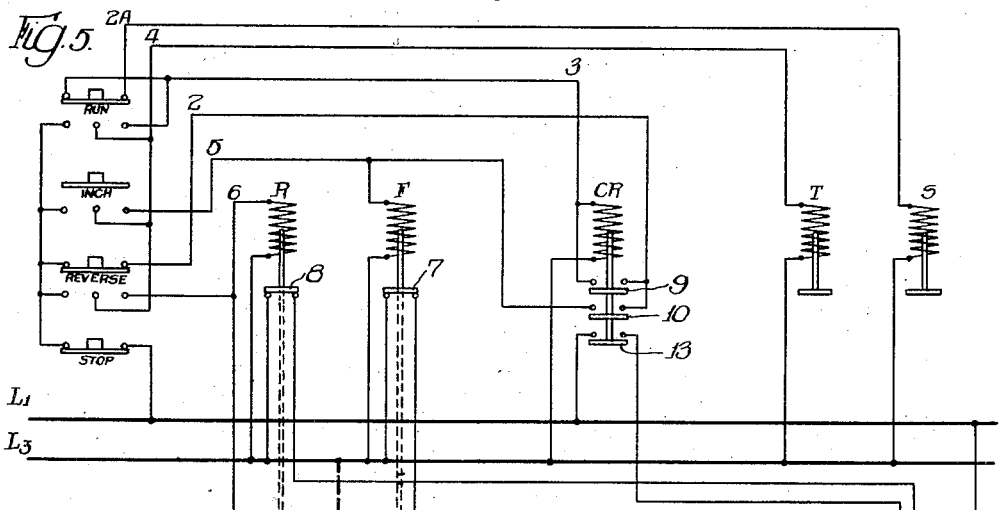
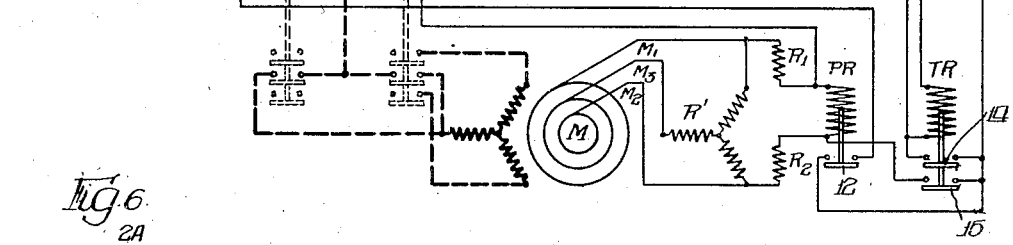
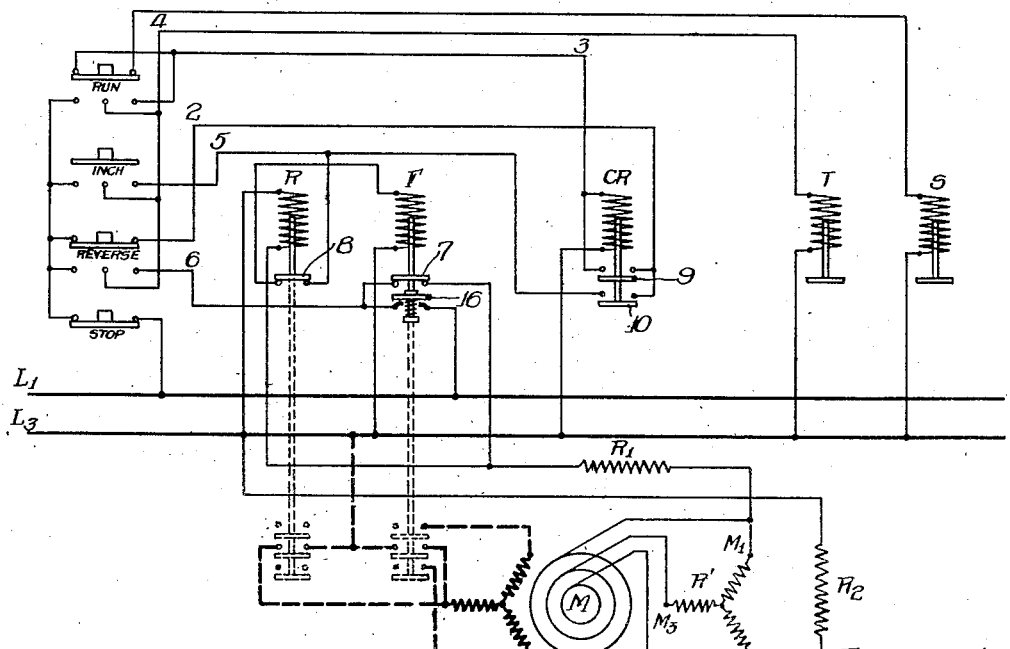
Inventor:
John D. Nies,
By Wilkinson, Huxley, Byron & Knight
Attys.

Patented Mar. 6, 1934

1,949,727

UNITED STATES PATENT OFFICE 1,949,727

ELECTRIC BRAKE FOR SLIP-RING MOTORS

John D. Nies, St. Charles, Ill., assignor to The Kimble Electric Co., Chicago, Ill., a corporation of Illinois Application April 6, 1931, Serial No. 527,923

4 Claims. (Cl. 172—179)

This invention relates to dynamic brakes for electric motors and more specifically concerns means whereby dynamic braking of polyphase slip-ring motors is accomplished.

As is well known in the art, direct current motors can be arranged readily to give dynamic braking, but alternating motors of the polyphase type have been lacking in this feature. To produce a quick stop in the case of an alternating current, it is customary to "plug" the motor, that is apply reverse power to the motor, and keep this reverse power on until the motor comes substantially to rest. This can be done manually or automatically. If the operation is automatic, the motor is arranged for such operation by being fitted with an electrical contact which remains closed whenever the motor has forward rotation except possibly at a very low speed. The coil of the reversing magnet switch is supplied with current through this contact, and also through an electrical interlock carried on the forward magnet switch, so that whenever the forward switch opens, the reverse switch automatically closes, and remains closed until the speed has fallen to some predetermined low value or to zero, when it is opened by the opening of the contact on the motor. This contact is usually operated by the friction of forward motion, and in some cases it remains closed for all forward motion and in order to release it, a slight back-up of the motor is required. This contact need not be operated by the motor directly, but can be operated from the machine driven by the motor.

The scheme as outlined in general terms in the foregoing is naturally subject to many practical modifications, all, however, depending upon the same principle, and in these various modified forms is in successful commercial operation. There are, however, certain objections to it. One of these is, that the motor or the driven machine must have certain mechanical operations performed on it in order to apply the device, in other words, a standard motor cannot be used without change. Another objection is the expense both of the device and of the labor of installing it. A third objection is that the device is not selective in its action but functions after a forward movement of any kind whether or not such functioning is desirable. In certain cases, it is not desirable to have the device function. For example, in controllers for printing presses, certain push buttons provide what is called the inching operation. Pressure on any one of these buttons causes the press to move forward only so long as the button is held down; in actual service, the operator presses and releases such a button repeatedly, causing the forward switch to close and open in rapid succession, thus jogging or inching the press along. A dynamic brake is not needed during this operation, but with the schemes as previously outlined, every time the forward switch opens, the reverse switch closes, therefore the motor alternately has forward and reverse power on it, which is hard on the equipment and is undesirable.

The primary object of the present invention is to provide a device for accomplishing dynamic braking of a slip ring motor.

Another object of the invention is to adapt said device so that it may be installed on the main control panel, thereby eliminating the necessity of providing special means on the motor or on the driven machine.

A further object consists in the provision of means whereby the device, for accomplishing the purpose set forth, may be held inoperative when the driven machine is being inched, either in forward or in reverse direction.

Still further objects will become apparent from the following description having reference to the accompanying drawings, in which.

Figure 1:
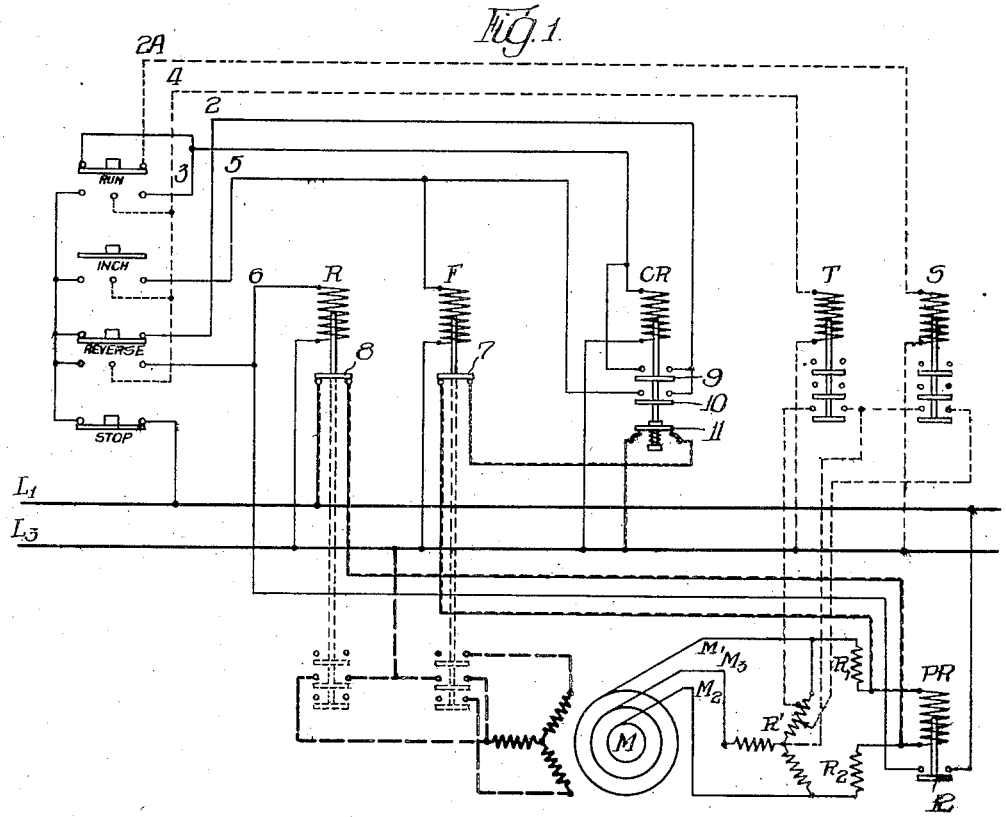
Figure 1 is a diagram of a control layout for slip-ring motors and illustrates one form of this invention.

Figures 5 and 6 indicate different forms of providing a plugging relay in connection with a control layout illustrated in Figure 1.

Figure 1 illustrates a typical control scheme for the magnetic switches of a slip-ring motor to which the present invention has been applied. Inasmuch as such control schemes exhibit considerable variety, the invention must be worked out in various modified forms to suit, without, however, departing from the essential principles involved. In Figures 1, 5 and 6 the main power wiring is not fully shown, this and other commonplace features being shown in dotted lines, to emphasize the invention. The control includes the forward switch F, the reverse switch R, the torque switch T, the speed selector switch S, and the control relay CR. Switches T, S and CR are not essential to the invention, but it is generally desirable to use them.

Switch F carries an electrical interlock 7, open when the switch is closed, and similarly R carries an interlock 8, open when R is closed. The wires leading to the control buttons are marked 2, 2A, 3, 4, 5 and 6, and this numbering is retained in the succeeding diagrams.

When the control relay is provided, it remains open during inching. For inching, the forward switch is closed directly by operation of an inching button and opens again when the button is released. The inching button closes the circuit for the forward switch through wire 5. For reverse operation, inching only is required and this is done by depressing a reverse button which closes the reverse switch through wire 6. This switch immediately opens when the button is released, and the control relay remains open also in this case. For running forward, pressure on any run button first closes the control relay through wire 3. This control relay normally has two contacts 9 and 10, both closed when the relay closes; one of these contacts, 9, maintains the relay in closed position, and the second one 10 brings in the forward switch which therefore remains closed for the run, or until the control relay is opened by pressure on a stop button. The speed selector switch closes when the upper contacts of the run button are closed, by the release of the button to supply current to wire 2A, thus putting the motor on the line at predetermined speed. In all these operations the torque switch is arranged to close during starting, in either direction and either for inching or running, but to open again soon after. The forward and reverse switches are usually interlocked mechanically and electrically against simultaneous closure.

The electrical interlocking consists of contacts carried on each of the two switches, so arranged that when either switch is closed, the circuit through which the coil of the other switch can receive current is automatically opened. The switches on the panel therefore make the following list:

Forward switch,
    Reverse switch,
    Torque switch,
    Control relay,
    Speed selector switch, and of these, the only ones which close during a forward run but remain open during inching either forwards or reverse, are the control relay and its auxiliary the speed selection switch. This fact makes the control relay advantageous for use in one of the arrangements described in the following.

The plugging system which is the subject of this specification requires the usual forward and reverse magnet switches: a control relay is desirable but not indispensible. In the following, three forms are shown: (1) one additional relay is required; (2) two additional relays are required; (3) no additional relay is required. Each of these forms may possess advantages for particular services.

Assume a relay to be connected across the rotor during the plugging of the motor. A plain magnetic relay connected across the rotor and closed, will remain closed over a very wide range of rotor speeds, inasmuch as the voltage and frequency of the rotor circuit vary in the same direction and rate. Assume a 60 cycle motor with a rotor wound for 220 volts when open circuited at stand still. Assume the motor to have been running at full speed forward, and then assume the forward switch to be opened and the reverse switch immediately thereafter closed. The rotor voltage is then for the instant 440 and the frequency 120 cycles, and the magnetic induction in the coil of the relay connected to this circuit will have a certain value.

As the rotor speed falls, the voltage and frequency fall at the same rate, and the magnetic induction remains constant. If the reverse power is kept on, the rotor will fall to zero speed and then start revolving in the new direction, but the relay will still remain closed until nearly full speed is reached, and will only open then because of the fact that the ohmic resistance of the relay coil begins to be large in comparison with the diminishing reactance of the same coil. However, by suitably modifying the circuit of which the coil of the plugging relay is a part, the relay can be made differently sensitive to voltage than to frequency and thus can be made to open automatically at any predetermined point in the slow down of the rotor.

Figure 2:
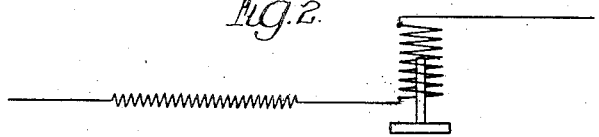
Figures 2, 3 and 4 show different methods of connecting an impedance with the coil of a relay.

There are many ways in which this modification can be carried out. The simplest is by connecting a resistance in series with the coil of the relay, Figure 2. A condenser can be used instead of the resistance, but offers the objection that it is puncturable, hence unreliable.

Figure 3:
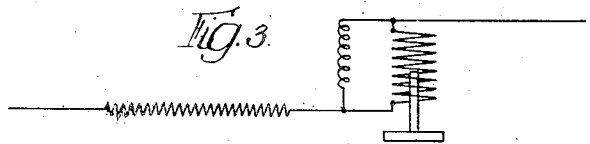
Figure 4:
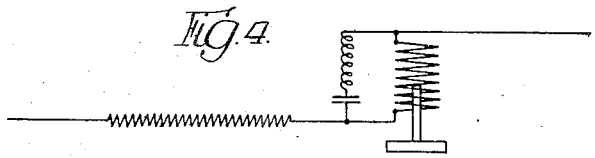

Still another plan is to use a resistance in series with the coil, Figure 3, the coil itself being shunted by a fixed reactor. In still another modification, Figure 4, a resistance is placed in series with the coil, and the coil is then shunted by a condenser and a reactor in series, the condenser and reactor being so selected as to resonate at the desired cut-out frequency, thus setting up a bypass around the coil of practically zero impedance, which assures the opening of the relay. Many other combinations will occur to any one familiar with the art. A simple resistance in series with the coil has been found entirely satisfactory provided the relay has proper characteristics. These characteristics are such that when the relay commences to unseal it will always immediately go to the wide open position. A relay of such characteristics with suitable resistance in series and supplied with current from the rotor will invariably open at a sharply defined speed in the slow down of the rotor. It is hereinafter called the plugging relay.

In the method of plugging as herein described, the forward switch is opened, then the reverse switch is closed, and then current derived from the rotor is utilized to keep the reverse switch closed until the predetermined point in the slow down is reached. There is an interval of time between the opening of the forward switch and the closing of the reverse switch, during which the rotor is electrically dead. The rotor, therefore, cannot be utilized as a source of voltage for closing the plugging relay, or more generally for initiating the braking process.

It is necessary then to provide other means for initiating the braking, and the means adopted for this purpose must be active only long enough to effect the initiation and immediately thereafter must become inactive, as otherwise the reverse switch will be held closed and the motor will reverse and continue to run reversed. In other words, the initiatory means must act only until the rotor voltage can assume control of the braking. Also, during the brief instant when both the initiatory means and the rotor voltage are active on the braking means, there must be no interference between the two.

To bridge over this interval, a delayed contact is provided, or its equivalent in the form of an additional relay, hereinafter called the transfer relay. The delayed contact is arranged to be carried by the forward switch or by the control relay, and is arranged to close momentarily upon the opening of the switch upon which it is mounted, and immediately thereafter to open. This arrangement is shown in Figure 1 in which the delayed contact shown diagrammatically is numbered 11.

In this figure, F is the forward switch, CR the control relay, R the reverse switch and PR the plugging relay. The motor is represented by M, the regulating rheostat by $R^1$. The latter is shown connected to the motor by wires $M_1$, $M_2$ and $M_3$. The wires $M_1$ and $M_2$ are utilized for operation of the plugging relay. In this diagram the control relay carries the delayed contact 11, which contact is or remains closed momentarily when the control relay opens, that is at each stop following a run. The forward switch carries an ordinary interlock 7, which is a contact that is closed when the forward switch is open. Similarly the reverse switch carries interlock 8. The forward and reverse switches may be interlocked with each other either by mechanical interlocks or by additional electric interlocks. Closure of the delayed contact allows current to flow through the circuit shown in the serrated line from $L_2$, through 11, through 7, through the coil of plugging relay and through 8 to $L_1$, thus putting the plugging relay coil across the line and causing it to close.

The resistances $R_1$ and $R_2$ prevent short circuit of the line voltage through either the regulating resistance $R^1$ or the rotor winding of the motor M. Closure of contact 12 of the plugging relay, permits current to flow from $L_2$ through the coil of the reverse switch, through 12 to $L_1$, thereby causing the reverse switch to close. Closure of the reverse switch energizes the motor with reverse torque, and the rotor commences to slow down. As soon as the rotor is energized, current derived from wires $M_1$ and $M_2$ passes to the plugging relay coil by way of resistances $R_1$ and $R_2$, and for the instant the plugging relay coil receives voltage directly from the line, and a different voltage and different frequency from the rotor.

The presence of the resistances $R_1$ and $R_2$ prevent interference between the two circuits, and in fact the two circuits assist each other in holding the relay closed. Closure of the reverse switch opens interlock 8, thus opening the circuit through which the coil of the plugging relay was connected to the line, and thereby leaving the coil connected only to wires $M_1$ and $M_2$ of the rotor, with $R_1$ and $R_2$ in series. The plugging relay remains closed until it opens automatically at the predetermined point in the rotor slow down. When the plugging relay opens, it opens the circuit of the reverse switch R, deenergizing the motor and stopping the retardation. Opening of the reverse switch closes interlock 8, but by this time momentary contact 11 on the control relay has opened, so that the plugging relay does not again close. The whole circuit is therefore ready for the next operation.

If momentary contact 11 is mounted on the control relay as shown in Figure 1, the plugging will act only after a forward run, which is probably desirable. If, however, said contact 11 is mounted on the forward switch, the plugging will act after any closure of the forward switch, whether for running or for inching.

Another modification is to provide the plugging relay with two additional contacts, connected respectively between the two sides of the plugging relay coil and rotor leads $M_1$ and $M_2$, so as to isolate the plugging relay completely from the rotor circuit except while plugging is actually occurring.

Instead of a delayed contact carried on the forward switch or on the control relay, its equivalent can be secured by means of an additional relay called the transfer relay, and marked TR in Figure 5. In this figure, F, CR, R, M and PR have the same meanings as before. In the arrangement shown in Figure 5, the control relay carries an additional contact 13, closed when the relay is closed, and open when it is open. When the control relay closes, as during a forward run of any length, current flows from $L_1$ through contact 13, through the coil of the transfer relay, then through interlock 8 on the reverse switch, then to $L_2$. The transfer relay thus closes upon any operation of CR. When closed, it closes contacts 14 and 15 and holds itself closed by current from $L_1$ which flows through contact 14, through the coil of the transfer relay, through interlock 8 and to $L_2$. When in making a stop the control relay opens, the transfer relay remains momentarily closed.

When a stop is made, the forward switch opens, thereby closing contact 7; current then flows from $L_2$, through 7, through the coil of the plugging relay, and through contact 15 of the transfer relay to $L_1$, thus applying line voltage to the coil. As in Figure 1, short circuit of the line voltage through the regulating resistance $R^1$ and the rotor winding is prevented by the resistances $R_1$ and $R_2$. The plugging relay then closes, on line voltage, closing contact 12. Current thereupon flows from $L_2$, through the reverse switch coil, through contact 12 of the plugging relay and to $L_1$. The reverse switch then closes, energizing the motor and causing voltage to appear on the rotor terminals.

A current from the rotor can now flow through wire $M_1$, through $R_1$, through the plugging relay coil, through $R_2$ to wire $M_2$. The plugging relay momentarily receives current from both sources, interference being prevented as before by the presence of the resistances $R_1$ and $R_2$. Simultaneously with the energization of the motor, and the development of voltage on wires $M_1$ and $M_2$, the reverse switch opens contact 8, which opens the circuit of the coil of the transfer relay, causing the relay to open, thus opening its contacts 14 and 15. Opening of contact 14 insures that the transfer relay remains open until the next run operation is made, and opening of contact 15 disconnects the coil of the plugging relay from its direct feed from the line, and leaves it connected only across the rotor wires $M_1$ and $M_2$ with $R_1$ and $R_2$ in series. As before, these resistances are adjusted so that the plugging relay opens at the predetermined point in the rotor slow down. Whenever it opens, contact 12 opens, and the opening of contact 12 opens the reverse switch, and the whole equipment thereupon becomes dead in readiness for the next run operation.

Certain modifications in this arrangement may be followed if desired. For example, contact 13 may be carried on the forward switch instead of on the control relay. If carried on the forward switch, the plugging will be operative after any forward operation whether inching or running. Further modifications will occur to anyone versed in the art.

Figure 6 shows a somewhat simpler arrangement in which the plugging relay is omitted, and the action is obtained directly from the reverse switch coil. The reverse switch coil is permanently connected across leads $M_1$ and $M_2$ of the rotor as was the plugging relay coil before, through resistances $R_1$ and $R_2$, these resistances serving the same purpose as before, that is to prevent interference when two distinct sources of voltage are connected to the same coil. The forward switch F carries an electrical interlock 7 which becomes closed when the forward switch opens, and also carries a momentary contact 16 which may be either open or closed when the forward switch is closed. If the former, as indicated diagrammatically, it closes after the forward switch opens, makes only a momentary contact and then reopens. If the latter, it simply remains closed for an instant after the forward switch has opened.

The operation is as follows: opening of the forward switch closes momentary contact 16 and interlock contact 7, current flows from $L_1$ through these contacts, through the coil of the reverse switch to $L_3$, under prevention of interference from the connection to the rotor by the interposed resistances $R_1$ and $R_2$, and causes the reverse switch to close. Closure of the latter energizes the motor in the reverse direction, and causes rotor voltage to appear on wires $M_1$ and $M_2$ and the coil of the reverse switch is then also fed from the rotor through these resistances $R_1$, $R_2$. The rotor begins to slow down.

The momentary contact 16 opens, at a predetermined time, and thus leaves the coil of the reverse switch in circuit across rotor leads $M_1$ and $M_2$ through resistances $R_1$ and $R_2$. These resistances are so adjusted together with the reverse switch as to permit the latter to open at a predetermined point in the slow down. When the switch opens, the motor becomes dead, and the device is ready for the next operation.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit. Especially it should be noted that there are other purposes for which a relay controlled by the rotor circuit may be used. One of these is to control the torque relay which may also be maintained energized by the rotor circuit.

I claim:

1. In combination with a polyphase slip-ring motor energized by a line circuit and having a rotor, a relay for controlling forward drive, a separate reverse switch, manually controlled means for closing said reverse switch when the motor is at rest, a circuit controlled solely by said forward relay and rotor for closing said reverse switch when the forward switch opens, and impedance in said circuit to render said circuit ineffective to hold said reverse switch closed after said rotor slows down to a predetermined speed.

2. In combination with a polyphase slip-ring motor energized by a line circuit and having a rotor, a relay for controlling forward drive, a separate reverse switch, manually controlled means for closing said reverse switch when the motor is at rest by connecting its coil across the line, a circuit including said coil controlled solely by said forward relay and rotor for closing said reverse switch when the forward switch opens, and impedance in said circuit to render said circuit ineffective to hold said reverse switch closed after said rotor slows down to a predetermined speed, said impedance being connected between said rotor and the connections of said coil with the line circuits for preventing conflicts between the line circuits and the rotor circuits in the operation of said reverse switch.

3. In combination with a polyphase slip ring motor energized by a line circuit and having an induced current element, a forward switch, a plugging relay having a coil connectible across the line and also across the induced current element of said motor, and a resistance in the connection between said induced current element and said coil to prevent interference between the induced currents and the line current in the operation of said relay, and contacts closed by said coil to energize said motor in a reverse direction.

4. In combination with a polyphase slip ring motor energized by a line circuit and having an induced current element, a forward switch, a plugging relay having a coil connectible across the line and also across the induced current element of said motor, and an impedance in the connection between said induced current element and said coil to prevent interference between the induced currents and the line current in the operation of said relay, and contacts closed by said coil to energize said motor in a reverse direction.

JOHN D. NIES.